(12) United States Patent
Trunde et al.

(10) Patent No.: US 10,596,734 B2
(45) Date of Patent: Mar. 24, 2020

(54) METHOD FOR PRODUCING SEALS ON ELECTROCHEMICAL REACTOR COMPONENTS

(71) Applicant: AREVA Stockage d'Energie, Aix en Provence (FR)

(72) Inventors: Sylvain Trunde, Peyrolles en Provence (FR); Nicolas Jacques Pascal Clergue, Marseilles (FR); Pierre-Etienne Girardot, Paris (FR); Christian Quinteri, Aix en Provence (FR)

(73) Assignee: AREVA STOCKAGE D'ENERGIE, Aix en Provence (FR)

( * ) Notice: Subject to any disclaimer, the term of this patent is extended or adjusted under 35 U.S.C. 154(b) by 216 days.

(21) Appl. No.: 15/543,997

(22) PCT Filed: Jan. 15, 2016

(86) PCT No.: PCT/EP2016/050814
§ 371 (c)(1),
(2) Date: Jul. 15, 2017

(87) PCT Pub. No.: WO2016/113408
PCT Pub. Date: Jul. 21, 2016

(65) Prior Publication Data
US 2018/0264690 A1    Sep. 20, 2018

(30) Foreign Application Priority Data
Jan. 16, 2015  (FR) ..................................... 15 50352

(51) Int. Cl.
*B29C 43/18*    (2006.01)
*H01M 8/0284*   (2016.01)
(Continued)

(52) U.S. Cl.
CPC ................ *B29C 43/18* (2013.01); *C25B 9/08* (2013.01); *H01M 8/0271* (2013.01);
(Continued)

(58) Field of Classification Search
None
See application file for complete search history.

(56) References Cited

U.S. PATENT DOCUMENTS 6,057,054 A * 5/2000 Barton ................ H01M 8/0271
                                                    429/483
6,261,711 B1 * 7/2001 Matlock ............. H01M 8/0247
                                                    429/513

(Continued)

FOREIGN PATENT DOCUMENTS

CN     1517452 A      8/2004
CN    101807700 A     8/2010
(Continued)

OTHER PUBLICATIONS

French Search Report for priority application.

*Primary Examiner* — Edmund H Lee
(74) *Attorney, Agent, or Firm* — Davidson, Davidson & Kappel, LLC

(57) ABSTRACT

A method is for producing seals on faces of electrochemical reactor components intended to be stacked in order to form an electrochemical reactor Each component is in the form of a plate and having a first face and an opposing second face. The first face is designed to receive a first seal and the second face is designed to receive a second seal. The method includes shaping the first seals on the first faces of the components, the first seals being at least partially polymerized; depositing the second seals on the second face of the components; and shaping the second seals by compressing a stack formed from the components alternating with molding plates. Each molding plate has a bearing face pressed against (Continued)

the first face of a component and includes a groove designed to receive, without deforming, the first seal previously formed on the first face of said component, and a molding face pressed against the second face of another component and having a molding surface for shaping the second seal deposited on the second face of said other component as a result of compressing the stack. The method also includes at least partially polymerizing the second seals.

7 Claims, 3 Drawing Sheets

(51) Int. Cl.
    *H01M 8/0286*     (2016.01)
    *H01M 8/0297*     (2016.01)
    *H01M 8/0271*     (2016.01)
    *C25B 9/08*     (2006.01)
    *H01M 8/1018*     (2016.01)
    *B29L 31/34*     (2006.01)

(52) U.S. Cl.
    CPC ....... *H01M 8/0284* (2013.01); *H01M 8/0286* (2013.01); *H01M 8/0297* (2013.01); *B29L 2031/3468* (2013.01); *H01M 2008/1095* (2013.01)

(56) References Cited

U.S. PATENT DOCUMENTS

| | | | | |
|---|---|---|---|---|
| 6,531,236 B1 * | 3/2003 | Hatoh | ................ | H01M 8/2483 |
| | | | | 429/454 |
| 6,649,097 B2 * | 11/2003 | Sasaki | ................ | H01M 8/0271 |
| | | | | 264/102 |
| 6,730,426 B2 * | 5/2004 | Wangerow | .......... | H01M 8/0271 |
| | | | | 429/434 |
| 8,197,990 B2 * | 6/2012 | Burdzy | ............... | H01M 8/0267 |
| | | | | 429/535 |
| 2002/0045046 A1 * | 4/2002 | Sasaki | ................ | H01M 8/0271 |
| | | | | 428/408 |
| 2002/0094464 A1 * | 7/2002 | Wangerow | .......... | H01M 8/0271 |
| | | | | 429/434 |
| 2002/0122970 A1 | 9/2002 | Inoue et al. | | |
| 2005/0130016 A1 | 6/2005 | Yang | | |
| 2006/0269818 A1 | 11/2006 | Inoue et al. | | |
| 2009/0004551 A1 * | 1/2009 | Burdzy | ............... | H01M 8/0267 |
| | | | | 429/514 |

FOREIGN PATENT DOCUMENTS

| | | |
|---|---|---|
| CN | 103707462 A | 4/2014 |
| JP | 2001332277 A | 11/2001 |
| JP | 2002237317 A | 8/2002 |
| JP | 2007165132 A | 6/2007 |
| JP | 2008181889 A | 8/2008 |
| JP | 2009009912 A | 1/2009 |
| WO | WO2005004264 A1 | 1/2005 |

* cited by examiner

METHOD FOR PRODUCING SEALS ON ELECTROCHEMICAL REACTOR COMPONENTS

The present invention relates to the field of electrochemical reactors, and in particular a method for manufacturing seals and electrochemical reactor components.

BACKGROUND

A fuel cell is an electrochemical reactor making it possible to produce electricity from a fuel and an oxidizer, by oxidation-reduction between the fuel and the oxidizer.

An ion exchange membrane fuel cell comprises two fluid compartments, each for the circulation of a respective reactive gas, and at least one membrane separating the fluid compartments for the oxidation-reduction of the reactive gases with ion exchange through the ion exchange membrane. One fluid compartment, called anodic compartment, is used for the circulation of a gaseous fuel, and one fluid compartment, called cathodic compartment, is used for the circulation of a gaseous oxidizer.

When the fuel cell is active, the fuel circulates in the anodic compartment along the face of each ion exchange membrane turned toward the end of the compartment, and the oxidizer circulates in the cathodic compartment along the face of each ion exchange membrane turned toward the cathodic compartment. The fuel cell produces electricity by oxidation-reduction reaction of the fuel and the oxidizer through each ion exchange membrane.

It is possible to produce a fuel cell made up of a stack of separating plates and ion exchange membranes, the separating plates being provided with channels for the circulation of the reactive gases along opposite faces of each ion exchange membrane. Anodic channels of the separator plates are connected to one another to form the anodic compartment, and cathodic channels of the separator plates are connected to one another to form the cathodic compartment.

It is necessary to ensure sealing between the separator plates and the stacked membranes to avoid gas leaks. To that end, it is possible to provide that the plates are equipped with sealing gaskets.

However, a fuel cell formed by a stack may comprise several tens of separator plates and membranes. Forming seals may therefore be tedious.

Furthermore, the seals must be manufactured with a precise geometry to obtain reliable sealing for a determined compression force of the stack.

SUMMARY OF THE INVENTION

One of the aims of the invention is to propose a method for manufacturing seals and components of an electrochemical reactor, the method being easy and cost-effective to carry out and making it possible to obtain seals with a precise geometry.

To that end, a method is provided for producing seals on faces of electrochemical reactor components intended to be stacked in order to form an electrochemical reactor, each component being in the form of a plate and having a first face and an opposing second face, the first face being designed to receive a first seal and the second face being designed to receive a second seal, the method comprising:
shaping the first seals on the first faces of the components, the first seals being at least partially polymerized;
depositing the second seals on the second face of the components; and
shaping the second seals by compressing a stack formed from the components alternating with the molding plates, each molding plate having a bearing face pressed against the first face of a component and comprising a groove designed to receive, without deforming, the first seal previously formed on the first face of said component, and a molding face pressed against the second face of another component and having a molding surface for shaping the second seal deposited on the second face of said other component as a result of compressing the stack; and
at least partially polymerizing the second seals.

In one embodiment, the shaping of the first seals comprises:
depositing the first seals on the first face of the components; and
shaping the first seals by compressing a stack formed from the alternating components and molding plates, each molding plate having a bearing face pressed against the second face of a component, and a molding face pressed against the first face of another component and having a molding surface for shaping the first seal deposited on the first face of said other component as a result of compressing the stack; and
at least partially polymerizing the first seals.

In one embodiment, identical molding plates are used for the shaping stack of the first seals and the shaping stack of the second seals.

In one embodiment, the molding plates are turned over relative to the components to go from the first stack to the second stack.

In one embodiment, each molding plate is formed in a single piece.

In one embodiment, each molding plate has a core bearing, on the molding face, shims attached on the core and defining seal shaping grooves between them.

In one embodiment, the components are separator plates, comprising grooves designed to define reactive fluid circulation channels.

A molding plate for producing seals on electrochemical reactor components designed to be stacked to form an electrochemical reactor is also provided, each component being in the form of a plate and being provided to receive seals on a first face and an opposing second face of the component, the molding plate having a bearing face comprising a groove designed to receive, without deforming it, a seal previously formed on a face of the component against which the bearing face is pressed, and a molding face having a molding surface for the shaping of a seal deposited on a face of a component against which the molding face is pressed.

In one embodiment, each molding plate is formed in a single piece.

In one embodiment, the molding plate has a core bearing, on the molding face, shims attached on the core and defining seal shaping grooves between them.

BRIEF SUMMARY OF THE DRAWINGS

The invention and its advantages will be better understood upon reading the following description, provided solely as an example, and done in reference to the appended drawings, in which.

DETAILED DESCRIPTION

The implementation of the manufacturing method illustrated in FIGS. 1 to 4 makes it possible to form seals on a plurality of electrochemical reactor components, by forming a seal on each of the two opposite faces of the components in plate form.

Figure 1:
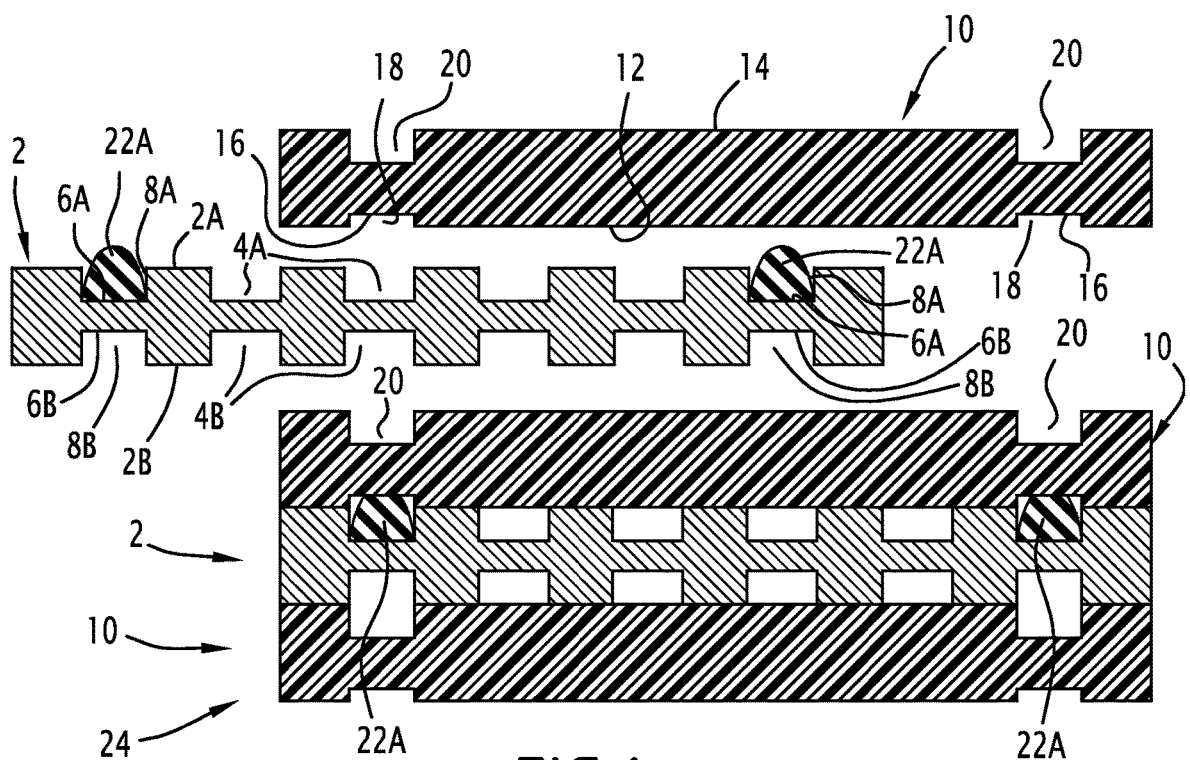
FIGS. 1 to 4 show successive steps of a method for producing seals on electrochemical reactor components, more particularly on separator plates.

As illustrated in FIG. 1, the electrochemical reactor components here are bipolar separator plates 2.

Each separator plate 2 is intended to be inserted between two ion exchange membranes in a stack of an electrochemical reactor.

Each separator plate 2 comprises a first face 2A and a second face 2B each provided with channels 4A, 4B for the circulation of reactive gases.

The first face 2A and the second face 2B each have a sealing step 6A, 6B provided to receive the seal to ensure sealing with an ion exchange membrane pressed against the face, or with an adjacent separator plate.

The sealing steps 6A, 6B are preferably situated at the periphery of the separator plate 2 and surround the reactive gas circulation channels 4A, 4B to provide sealing around the latter. The first face 2A and the second face 2B each have a sealing step extending around one or several closed line(s), to define sealed zones on the separator plate 2.

The first face 2A and the second face 2B each have sealing grooves 8A, 8B to receive a seal, the sealing steps 6A, 6B being provided at the bottom of the sealing grooves 8A, 8B. Alternatively, the sealing steps 6A, 6B are not provided at the bottom of the grooves.

The manufacturing method is carried out using several identical molding plates 10.

Each molding plate 10 comprises a molding face 12 and a bearing face 14.

The molding face 12 is provided with a molding surface 16 provided to come into contact with a seal deposited on a face of a separator plate 2 against which the molding face 12 of the molding plate 10 is pressed.

The molding surface 16 is provided to shape the seal with a precise geometry, due to the pressing of the molding plate 10 against the separator plate 12. The molding surface 16 is in particular provided to form the seal with a predetermined height H, preferably comprised in an allowance range, for example with an allowance of +/− several micrometers.

The molding face 12 here comprises a molding groove 18 at the bottom of which the molding surface 16 is provided.

The bearing face 14 of each molding plate 10 is provided to bear against a face of a separator plate 2 provided with a seal deposited, shaped and at least partially or completely polymerized, without coming into contact with this seal.

The bearing face 14 comprises a receiving groove 20 provided to receive a seal previously formed on a face of the separator plate 2 when this face of the separator plate 2 is pressed against the bearing face 14 of the molding plate 10. The receiving groove 20 is positioned to be situated at the sealing step of the separator plate, and has dimensions allowing the walls of the receiving groove 20 not to interfere with the seal previously formed on the separator plate 2.

As shown in FIG. 1, the molding groove 18 and the receiving groove 20 are positioned in line with one another. The molding groove 18 has a depth P1 strictly smaller than that P2 of the receiving groove 20.

The method for producing seals on the separator plates will now be described in reference to FIGS. 1 to 4.

The first face 2A and the second face 2B of the separator plates 2 initially have no seals.

In a first step (FIG. 1), a first seal 22A is deposited on the first face 2A of the separator plate 2. The first seal 22A is deposited on the sealing step 6A of the first face 2A.

The expression "deposit the seal" here means depositing a seal seam in a viscosity state allowing it to be shaped. The seal is provided in a synthetic or natural polymerizable material. At the time of deposition, the seal is not polymerized.

The first seal 22A is deposited on the separator plate 2 in a known manner, for example using an automatic machine having an injection nozzle movable relative to the separator plate to apply the first seal 22A along the sealing step 6A.

The separator plates 2 whose first faces 2A are provided with non-polymerized first seals 22A are used to form a first stack 24 in which the separator plates 2 and the molding plates 10 alternate, the molding faces 12 of the molding plates 10 being pressed against the first faces 2A of the separator plates 2, and the bearing faces 14 of the molding plates 10 being pressed against the second faces 2B of the separator plates 2.

Preferably, the first faces 2A of the separator plates 2 are preferably turned upward, and the molding faces 12 of the molding plates 10 are turned downward.

The first stack 24 is made progressively, each separator plate 2 being added once the first seal 22A has been deposited thereon. Alternatively, the first seals 22A are deposited on several separator plates 2, before stacking these separator plates 2 with alternating molding plates 10.

Due to the pressing of the molding face of a molding plate against the first face of each separator plate, the molding surface of the molding plate is pressed against the first seal deposited on this separator plate. This results in shaping of the seal.

Figure 2:
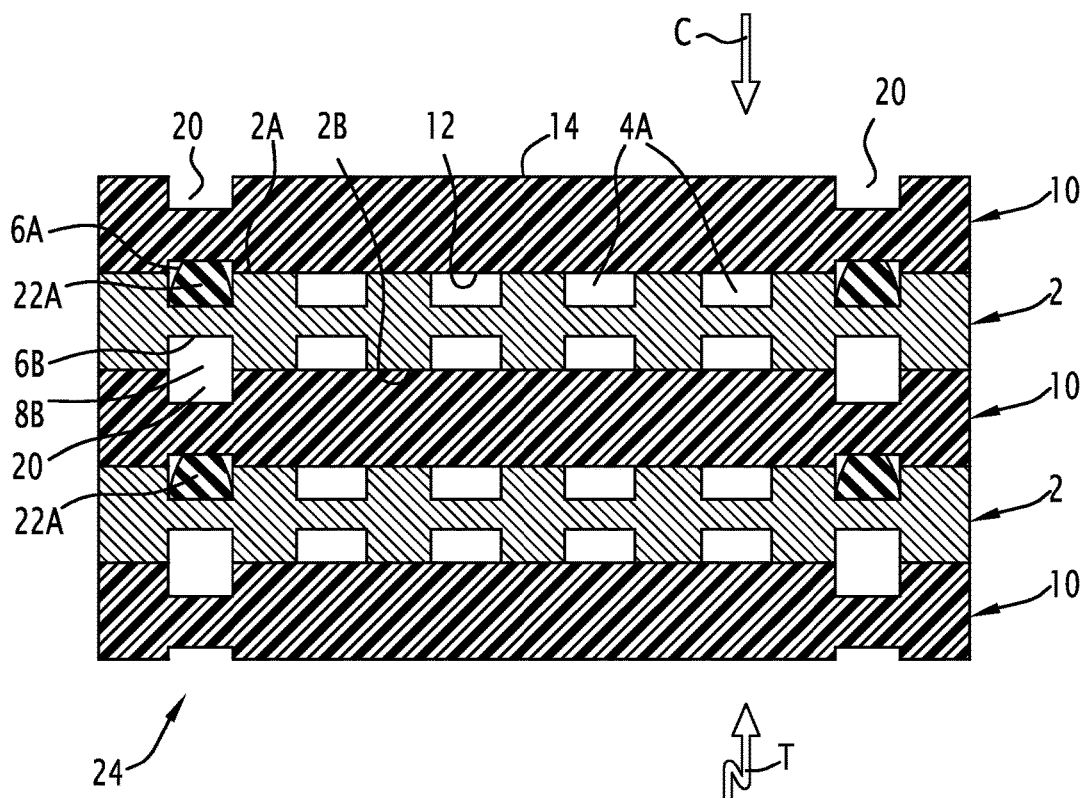
Figure 3:
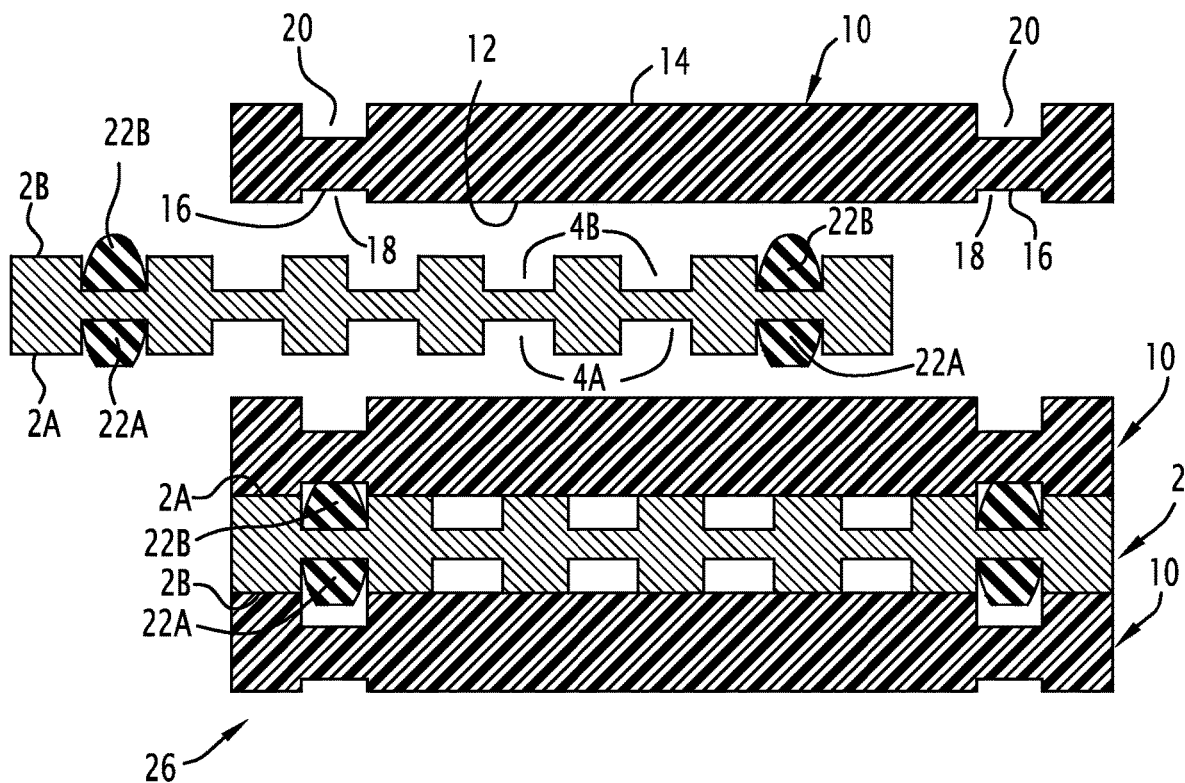
Figure 4:
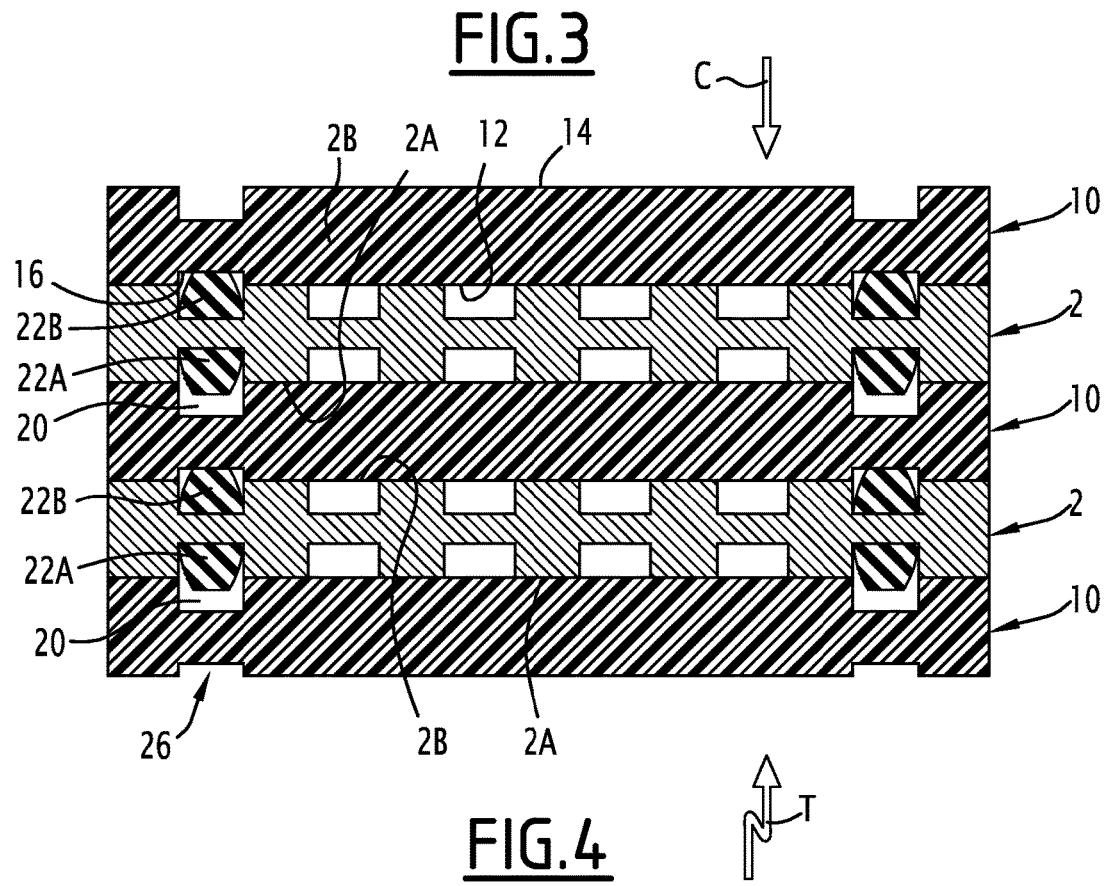

The expression "shaping of the seal" here refers to giving the seal the required geometry, here in particular the required height H. As shown in FIGS. 1 and 2, a shaped seal here has a flat at its apex.

In a third step (FIG. 2), the first seals 22A are at least partially polymerized. The first seals 22A are only partially polymerized or substantially completely polymerized. The first seals 22A are polymerized enough to retain their geometry after stripping. The first seals 22A are for example surface polymerized so as to retain their geometry, while their cores are not polymerized.

To ensure polymerization, the first stack 24 is for example heated to a determined temperature and for a determined length of time (Arrow T).

Preferably, a compression force C (FIG. 2) is exerted on the first stack of 24 to press the molding face 12 of each molding plate 10 against the first face 2A of the separator plate 2 across from it. The compression force is maintained for shaping and during polymerization.

In a fourth step (FIG. 3), each separator plate 2 is removed from the first stack. The second non-polymerized seal 22B is deposited on the second face 2B of the separator plate 2, more particularly on the sealing step 6B of the second face 2B.

The separator plates 2 whose second faces 2B are provided with non-polymerized second seals 22B are used to form a second stack 26, in which the separator plates 2 are stacked alternating with the molding plates 10, the molding faces 12 of the molding plates 10 being pressed against the second faces 2B of the separator plates 2, and the bearing face 14 of the molding plates 10 being pressed against the first faces 2A of the separator plates 2. The first seals 22A are received in the receiving grooves 20 of the bearing faces 14 without interfering with the molding plates 10.

In the second step 26, the separator plates 2 are turned over relative to the first stack 24, while the molding plates 2 are not turned over.

In the second stack 26, the second faces 2B of the separator plates 2 are preferably turned upward, and the molding faces 12 of the molding plates 10 are turned downward.

Due to the production of the second stack 26, the second seals 22B are shaped by the molding plates 10 with the desired geometry, and in particular with the desired height H.

Preferably, the second stack is subject to a compression force (Arrow C) for the shaping of the second seals 22B. The compression force is maintained for shaping and during polymerization.

Owing to the receiving grooves of the bearing faces, the first seals previously formed on the first faces of the separator plates are not deformed or stressed in the second stack. They thus retain the shape given to them in the first stack.

Once the second stack is produced, the second seals are completely polymerized. If the first seals were only partially polymerized at the end of the polymerization applied to the first stack, their polymerization is completed during the polymerization applied to the second stack.

To go from the first stack (FIG. 2) to the second stack (FIG. 4), it is possible to proceed plate by plate, by transferring a molding plate 10 from the first stack 24 to the second stack 26 without turning it over, then taking the separator plate 2 that was situated below in the first stack 24, while depositing the second seal 22B on its second face 2B, then setting it on the second stack 26 after having turned it over.

The first seals 22A and the second seals 22B of the separator plates 2 are formed with the same molding plates 10, using a smaller number of molding plates 10, since each molding plate 10 is used to mold a seal on a separator plate 2 situated on one side and serves for bearing for another separator plate 2 situated on the opposite side.

The smaller number of molding plates 10 limits the cost of the tooling to carry out the production method, since a limited number of molding plates 10 suffices, as well as the implementation itself of the production method, since the manipulations of the molding plates 10 are also limited. The storage of the molding plates 10 is also made easier. This is particularly advantageous for producing electrochemical reactors, which may comprise several tens of stacked separator plates 2.

The production method may be carried out effectively, in particular to go from the first stack to the second stack.

Furthermore, the seals can be made with better mastery of the polymerization times. All of the first seals are produced with a close or identical polymerization time, and all of the second seals are produced with a close polymerization time.

Preferably, the first seals 22A are only partially polymerized in the first stack 24 when one goes to depositing the second seals 22B and forming the second stack 26. This makes it possible to limit the difference in polymerization times of the first seals 22A on the one hand, and the second seals 22B on the other hand.

The first seal 22A and the second seal 22B of each separator plate 2 are identical. They extend along the same line(s) and have the same geometry in section. The first seal 22A and the second seal 22B of each separator plate 2 are formed with identical molding plate 10 molding faces 12.

Figure 5:
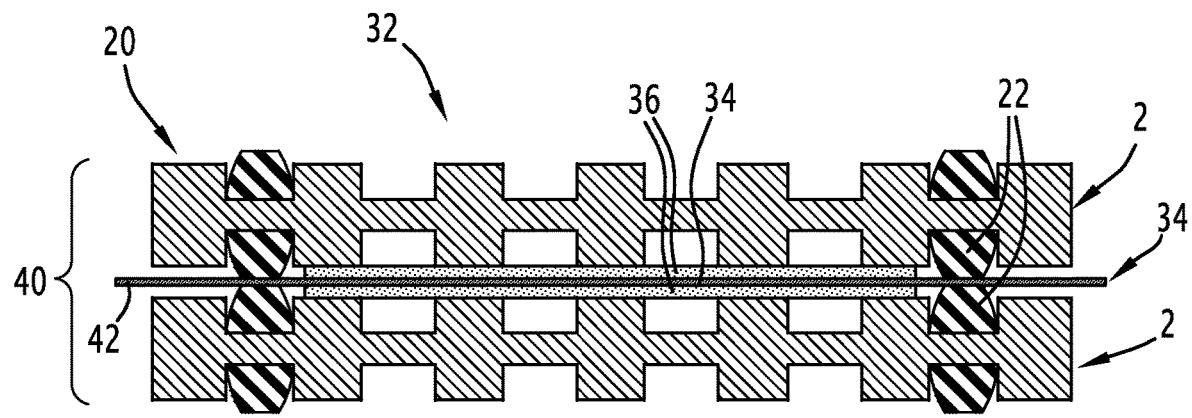
FIG. 5 partially illustrates an electrochemical reactor formed using separator plates.

As shown in FIG. 5, an ion exchange membrane electrochemical reactor 30 comprises a stack 32 in which the separator plates 2 and membrane/electrode assemblies 34 alternate.

Each membrane/electrode assembly 34—also called EME—comprises an ion exchange membrane 36 sandwiched between two electrodes 38. Each membrane/electrode assembly 34 is sandwiched between two separator plates 2.

Only one separator plate/EME/separator plate assembly is shown here, but the stack 32 in practice comprises a plurality of such separator plate/EME/separator plate assemblies. Each separator plate/EME/separator plate assembly defines an elementary electrochemical cell 40 of the electrochemical reactor 30, which in practice comprises several of these.

The seals 22 of the opposite faces of the separator plates 2 provide sealing against reactive gases between the separator plates 2, and in particular sealing of the circulation channels for reactive gases on these faces.

The membrane 36 of the membrane/electrode assembly has a peripheral region 42 that overflows relative to the electrodes 38. This peripheral region 42 is pinched between the seals 22 of the opposite faces of the separator plates 2 sandwiching the membrane/electrodes 34 assembly. In one alternative, the membrane of the membrane/electrodes assembly has no protruding peripheral region, and the opposite faces of the separator plates come into contact with one another.

The electrochemical reactor 30 is for example a fuel cell is an electrochemical reactor making it possible to produce electricity from a fuel and an oxidizer, by oxidation-reduction between the fuel and the oxidizer. Alternatively, the electrochemical reactor is an electrolyzer making it possible to produce dihydrogen and dioxide from water and electricity.

As shown in FIGS. 1 to 4, the molding plates 10 are made in a single piece of material. The molding plates 10 are for example made from plastic. The receiving grooves 20, the precise geometry of which is not essential, can result from molding of the molding plates 10, while the molding surfaces 16 are preferably obtained by machining, in order to have a very precise geometry.

Figure 6:
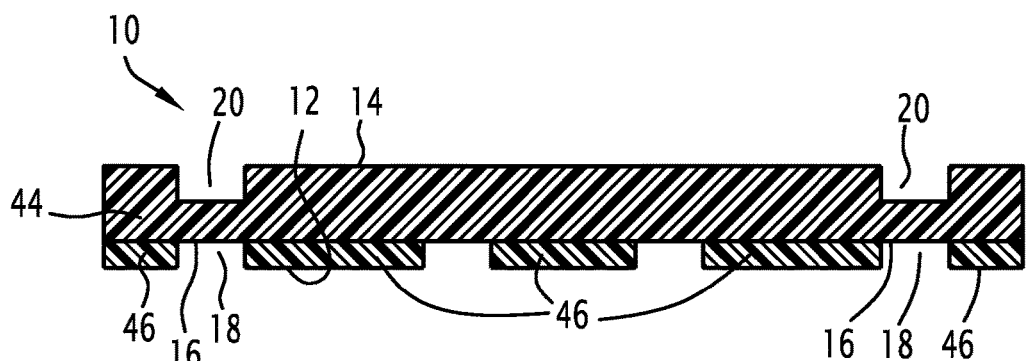
FIGS. 6 and 7 illustrate molding plates for carrying out the manufacturing method.

In the alternative illustrated in FIG. 6, a molding plate 10 is formed by a support plate 44, one face of which defines the bearing face 14 of the molding plate and is provided with receiving grooves 20, and the other face bears shims 46 attached on the support plate 44 and defining the molding grooves 18 between them. The bottom of the molding grooves 18 is formed by said other face of the support plate 44 derived from the molding or made by machining, at least at the molding grooves 18, in order to have a very precise geometry.

Figure 7:
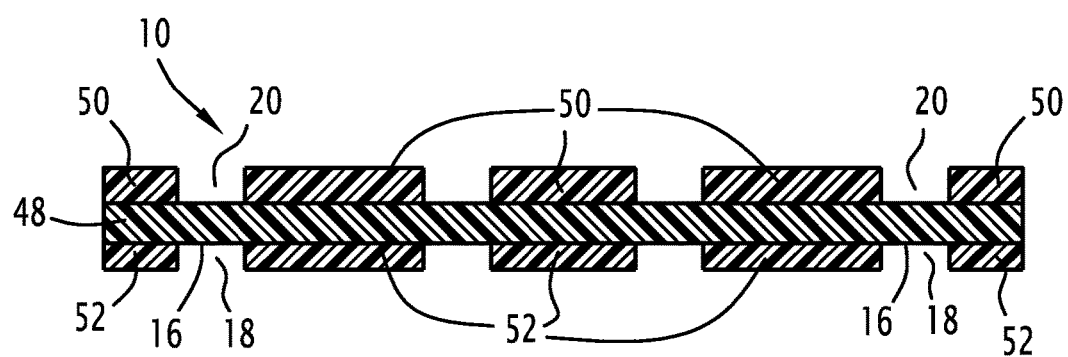

In the alternative illustrated in FIG. 7, a molding plate 10 comprises a support plate 48 provided on one of its two faces with shims 50, 52 in order to define the receiving grooves 20 on one face and the molding grooves 18 on the other face.

The production method of FIGS. 1 to 4 has been described to produce seals on separator plates. The production method is applicable to other electrochemical reactor components in plate form. For example, the manufacturing method is applicable to ion exchange membranes, to form the seals on the ion exchange membranes, as replacements for or in addition to seals manufactured on separator plates.

What is claimed is:

1. A method for producing seals on faces of electrochemical reactor components configured to be stacked in order to form an electrochemical reactor, each of the electrochemical reactor components being in the form of a plate and having a respective first face and an opposing respective second face, each of the first faces being designed to receive a respective first seal and each of the second faces being designed to receive a respective second seal, the method comprising:

shaping the respective first seal on the respective first face of each of the electrochemical reactor components, each of the shaped first seals being at least partially polymerized;

depositing the respective second seal on the respective second face of each of the electrochemical reactor components having the respective shaped and at least partially polymerized first seal on the respective first face;

shaping the second seals by compressing a first stack formed from the electrochemical reactor components, each having the respective shaped and at least partially polymerized first seal on the respective first face and the respective deposited second seal on the respective second face, alternating with molding plates, each of the molding plates having:

a respective bearing face that, as a result of the compressing of the first stack, is pressed against the first face of a respective one of the electrochemical reactor components of the first stack and comprising a respective groove designed to receive, without deforming, the respective first seal previously formed on the first face of said respective one of the electrochemical components of the first stack, and a respective molding face that, as a result of the compressing of the first stack, is pressed against the second face of a respective another one of the electrochemical reactor components of the first stack and having a respective molding surface for shaping the respective second seal deposited on the second face of said respective another one of the electrochemical reactor components of the first stack; and at least partially polymerizing each of the second seals.

2. The production method according to claim 1, wherein the shaping of the respective first seal on the respective first face of each of the electrochemical reactor components comprises:

depositing the respective first seal on the respective first face of each of the electrochemical reactor components;

shaping the first seals by compressing a second stack formed from the electrochemical reactor components alternating with molding plates, each of the molding plates having a respective bearing face pressed against the second face of a respective one of the electrochemical reactor components, and a molding face pressed against the first face of a respective another one of the electrochemical reactor components and having a respective molding surface for shaping the respective first seal deposited on the first face of said respective another one of the electrochemical reactor components as a result of compressing the second stack; and at least partially polymerizing each of the first seals.

3. The production method according to claim 1, wherein identical molding plates are used for the first stack and the second stack.

4. The production method according to claim 3, wherein the molding plates are turned over relative to the electrochemical reactor components to go from the first stack to the second stack.

5. The production method according to claim 1, wherein each of the molding plates is formed in a single piece.

6. The production method according to claim 1, each of the molding plates has a core bearing, on the respective molding face, shims attached on the core bearing and defining seal shaping grooves between them.

7. The production method according to claim 1, wherein the electrochemical reactor components are separator plates, comprising grooves designed to define reactive fluid circulation channels.

* * * * *